United States Patent [19]

Seymour

[11] Patent Number: 4,561,781

[45] Date of Patent: Dec. 31, 1985

[54] AGRICULTURAL FEED BLENDING APPARATUS

[75] Inventor: Shaun A. Seymour, New Holland, Pa.

[73] Assignee: Sperry Corporation, New Holland, Pa.

[21] Appl. No.: 615,617

[22] Filed: May 31, 1984

[51] Int. Cl.$^4$ .............................................. B01F 15/02
[52] U.S. Cl. ................................ 366/132; 241/101 B;
366/134; 366/156; 366/162; 366/181; 366/182;
366/186; 366/195; 366/603
[58] Field of Search .............. 366/603, 132, 133, 134,
366/152, 156, 157, 158, 160, 162, 177, 181, 182,
186, 194, 195, 196; 241/101 B, 101 D

[56] References Cited

U.S. PATENT DOCUMENTS

| | | | |
|---|---|---|---|
| 750,949 | 2/1904 | Darrow et al. | 366/186 X |
| 2,800,238 | 7/1957 | Oliver . | |
| 3,182,919 | 5/1965 | Geerlings | 366/603 X |
| 3,254,878 | 6/1966 | Lorenzen | 366/603 X |
| 3,356,270 | 12/1967 | Heider | 222/413 |
| 3,645,505 | 2/1972 | McLeod, Jr. et al. | 366/177 X |
| 3,721,179 | 3/1973 | Applegate | 99/487 |
| 3,997,146 | 12/1976 | Kline | 366/156 |
| 4,432,499 | 2/1984 | Henkensiefken et al. | 366/603 X |

FOREIGN PATENT DOCUMENTS 911425 10/1972 Canada .................................. 366/603

*Primary Examiner*—Philip R. Coe
*Attorney, Agent, or Firm*—Darrell F. Marquette; Frank A. Seemar; C. Hercus Just

[57] ABSTRACT

An agricultural feed mixing and blending machine including a plurality of bins for different feed materials, variable speed metering augers in the bottoms of each bin to feed individual materials respectively to a confluence and mixing auger beneath the bins and operable to transfer the mixed material to a grinding unit, the confluence auger being operable when the metering augers are idle, to feed individual materials from an inlet hopper to an elevating auger and an upper transfer auger to deliver different materials respectively to the bins, the upper transfer auger also being reversible to deliver mixed material to the grinding unit, and a discharge auger being operable to receive mixed material and discharge it from the machine.

The present invention primarily is concerned with the inclusion of a container for an additive, such as chemicals or medicinal drugs, to the discharge mechanism for the mixed material for blending the additive in a controlled manner. When feeding of the additive is stopped, the discharge mechanism purges the additive by feeding sufficient mixed feed material through the discharge mechanism to insure no residue of the additive therein.

12 Claims, 5 Drawing Figures

AGRICULTURAL FEED BLENDING APPARATUS

BACKGROUND OF THE INVENTION

In modern agricultural practice, particularly in regard to preparing mixtures of feed and especially feed to be fed to animals to be slaughtered for human consumption, it is relatively common at present to provide feed material grinders and mixers which contain various feed materials in separate bins and convey quantities thereof, preferably measured, to grinding and/or mixing equipment which produces a mixed feed of desired proportions of ingredients which is ready for delivery either to storage or to feed lots or troughs, as desired. Various arrangements of conveyors and especially augers are employed in prior devices of the type referred to and it is also relatively common practice to include mechanism of this type in portable machines and particularly those which derive power from a PTO arrangement which, for example, quite commonly derives power from a tractor. The present invention comprises an improvement over this type of mechanism and provides advantages over those devices which have been developed heretofore.

Representative of certain types of agricultural material grinder-mixer machines which have been developed heretofore are prior U.S. Pat. Nos. 2,800,238 to Oliver, dated July 23, 1957, and 3,997,146, to Kline, dated Dec. 14, 1976. In these devices, there is a central cylindrical tank having a truncated conical bottom and in which a vertical auger is arranged to feed material upwardly from an inlet auger communicating with the bottom of the tank and arranged to move feed either from a hammermill or a mixing hopper, the material then being further mixed in the tank prior to delivering the same to a discharge mechanism such as a laterally extending auger from which the material is discharged to a feed lot, trough, or otherwise.

It has also been previously proposed to provide in a portable structure a plurality of bins or hoppers in which, for example, different materials of feed are contained and augers are provided in the bottoms of the bin to feed the material for discharge in any desired manner. Such a machine comprises the subject matter of prior U.S. Pat. No. 3,356,270 to Heider, dated Dec. 5, 1967 and said patent illustrates certain types of closures over the augers in the bottom portion of the bin and mechanism to open the closures to various degrees, as desired.

A more sophisticated type of portable feed grinder-mixer than disclosed in the preceding patents comprises the subject matter of prior U.S. Pat. No. 4,432,499 to Henkensiefken et al, dated Feb. 21, 1984, in which a single, relatively large hopper or bin is mounted on a portable frame and a pair of vertical augers extend upward from the lower portion of the bin to achieve mixing of material therein and, in the lower portion of the bin, a pair of horizontal augers are arranged for rotation in opposite directions in order to effect substantial mixing of material in the bin prior to the same being discharged, for example, by means of a vertical auger which communicates with an upper horizontal auger adapted to be swung to any location desired above the top of the bin.

In the Henkensiefken et al patent, the addition of an additive to the mixed material from a supplemental hopper 52 is suggested and in the Kline patent, an auxiliary hopper 45, for a similar purpose, is disclosed but such addition is achieved in a different manner from that of the present invention.

In prior U.S. Pat. No. 3,721,179 to Applegate, dated Mar. 20, 1973, apparatus is also shown wherein addition of an additive to crop material is accomplished. In the Applegate patent apparatus is disclosed for applying liquid preservative to grain as it is being moved by an auger conveyor.

Due to certain requirements of constantly progressive systems of feeding stock animals and especially those intended for human consumption, more sophisticated mechanisms are required by consumers of the machines presently being manufactured and, accordingly, the necessitated changes require additions and innovations not found in the prior art and the present invention is an example of satisfying the further demand for improvements by the agricultural feeding industry, details of which are set forth below.

SUMMARY OF THE INVENTION

It is among the principal objectives of the present invention to provide a combination grinder and blender or mixing machine to handle different kinds of agricultural feed material and grind and mix and/or blend the same in quantities which are delivered automatically either from one tank or from a plurality of bins each containing one of said materials and then discharge the mixed and ground material with the subsequent inclusion of further additives in precisely measured quantities which is achieved by a control mechanism with which the present invention primarily is concerned.

It is another object of the invention to provide a grinding and mixing unit suitable for delivery of mixed material to a generally outwardly extending discharge auger and, incident to such discharge operation, further additives such as chemicals or medicinal drugs may be introduced to the mixed material while being discharged, such additions being at controlled rates.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENT

Figure 1:
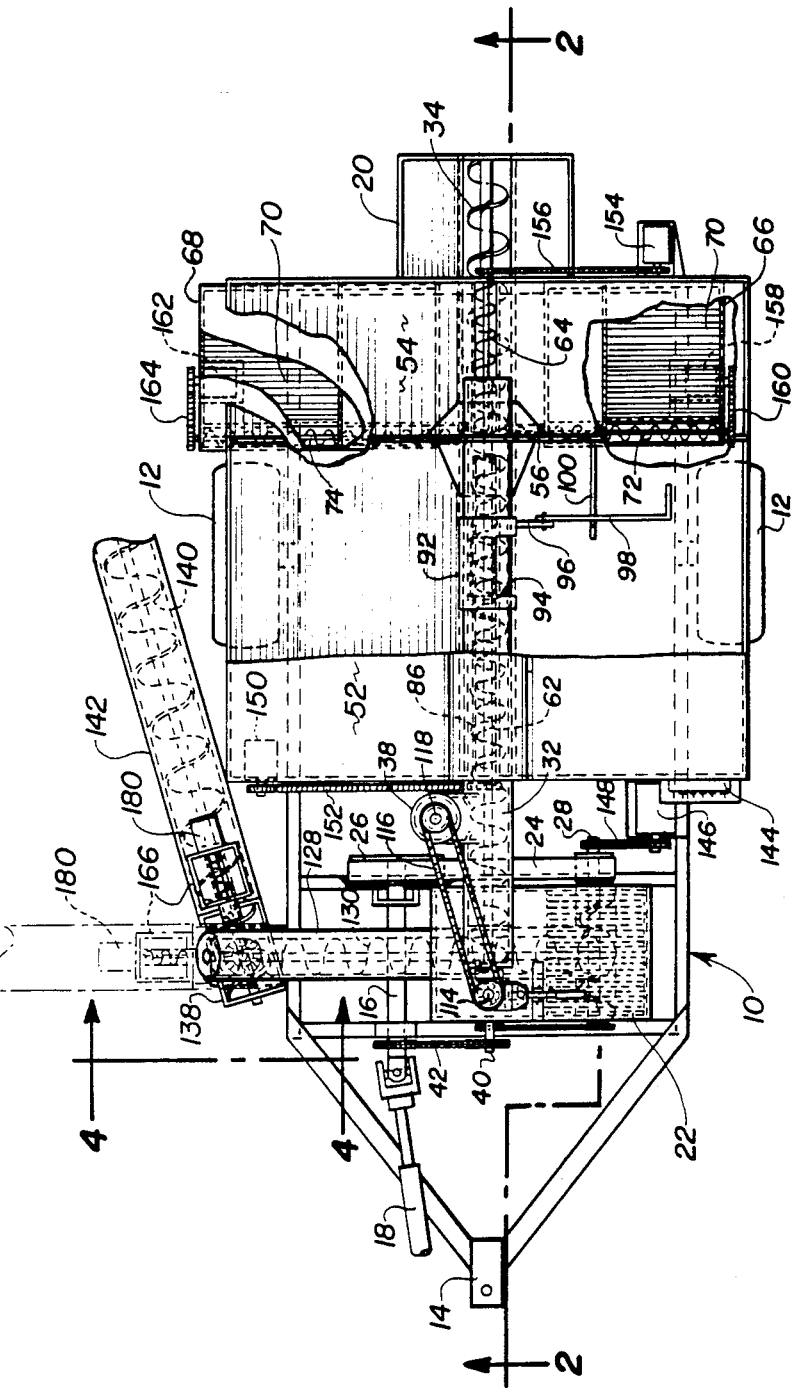
FIG. 1 is a top plan view of an agricultural grinder-blender machine embodying the principles of the present invention.
Figure 2:
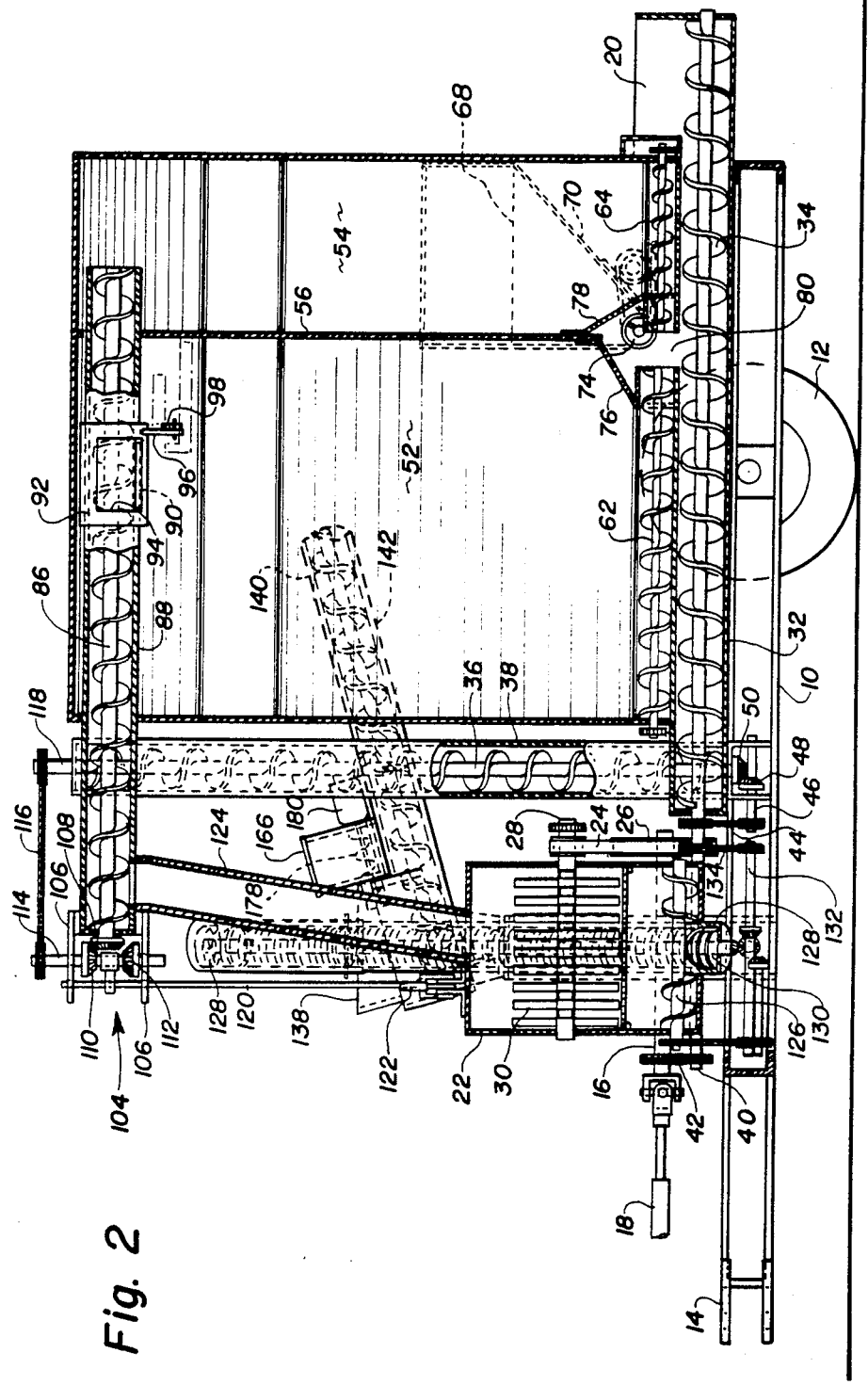
FIG. 2 is a vertical sectional view of the machine shown in FIG. 1 as seen on the line 2—2 thereof.

Referring particularly to FIGS. 1 and 2, the agricultural machine comprising the present invention basically includes a frame 10 which, in the preferred embodiment, is portable by including a pair of wheels 12 and the forward end is provided with a clevis 14 arranged to be connected to a source of power such as an agricultural tractor, not shown. The forward portion of the frame 10 also includes a driven shaft 16 arranged to be driven by a PTO shaft 18 connectable to such tractor. At the rearward end of the frame 10 is material receiving means in the form of a hopper 20 and the forward end of the frame 10 supports material grinding means specifically illustrated as a hammermill 22 which is driven by a belt 24 which interconnects a sheave 26 on shaft 16 and shaft 28 of the beater 30 of hammermill 22.

Extending rearwardly from hammermill 22 and substantially centrally of the frame 10 is a tubular housing 32 within which a combination confluence and mixing auger 34 is rotatable, said auger extending at one end into the hopper 20 and then forwardly to the lower end of an elevating auger 36 which is rotatable within a closely confining tube 38 which is connected to the inner end of the housing 32 for intercommunication between the respective augers rotatable therein. Driven shaft 16 directly drives shaft 40 of auger 34 as best seen in the forward portion of FIGS. 1 and 2, said shafts being interconnected by sprocket chain 42 which extends around sprocket gears respectively on said shafts. Shaft 40, by means of another sprocket chain 44 drives a jack shaft 46 by means of sprocket gears respectively on said shafts and mounted on jack shaft 46 is a bevel gear 48 which meshes with another bevel gear 50 fixed to the lower end of the central shaft of elevating auger 36, whereby it will be seen that the mechanism thus far described is driven by the PTO shaft 18.

Figures 3, 4:
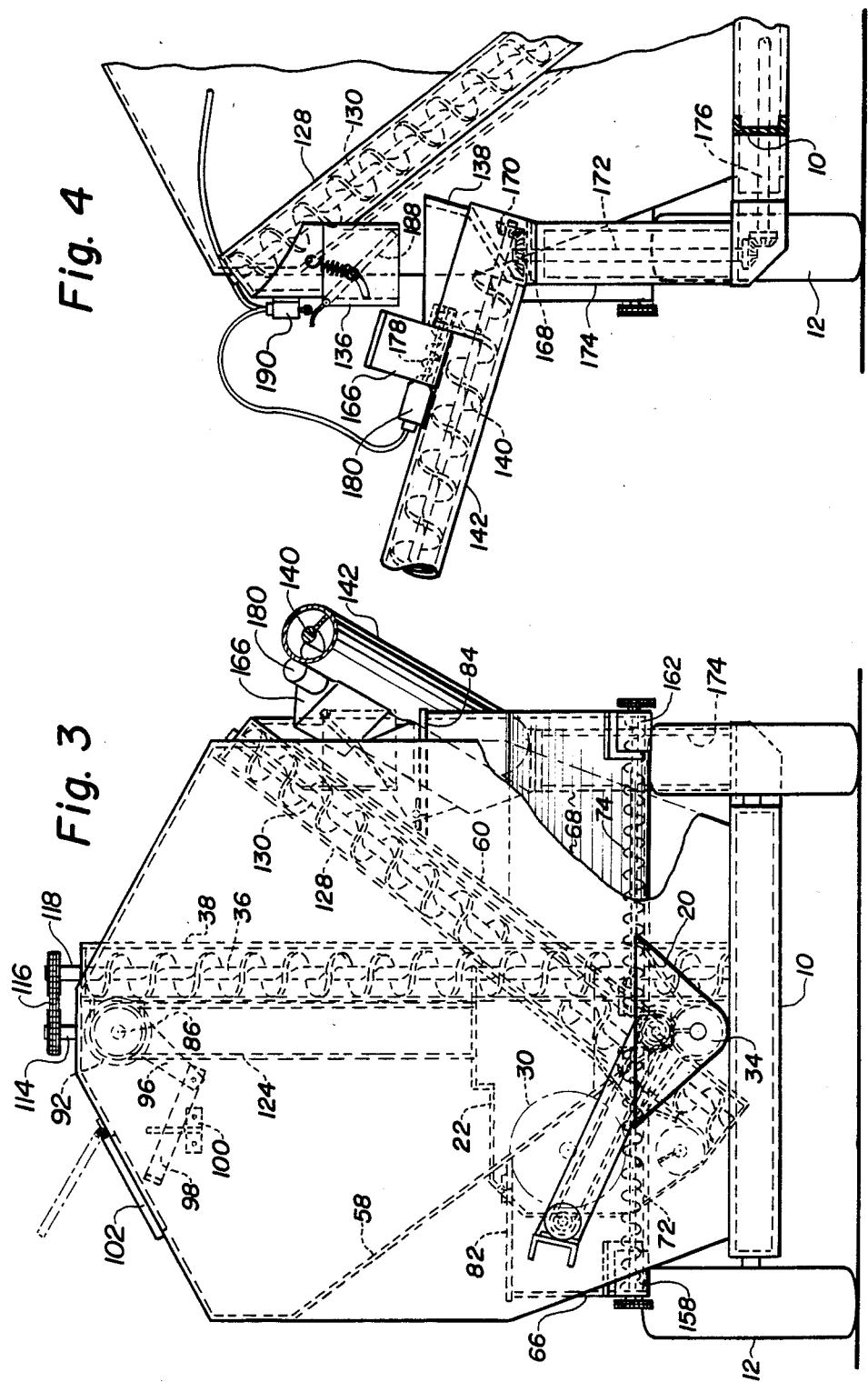
FIG. 3 is a vertical end view of the righthand end of the machine as viewed in FIG. 1.
FIG. 4 is a fragmentary vertical sectional view of a portion pf the machine as seen on the line 4—4 of FIG. 1.

A plurality of bins are arranged in compact nature upon frame 10 as best shown in FIGS. 1 and 2 but also in FIG. 3. Said bins comprise a first or forward bin 52 and a second or rearward bin 54, said bins being separated by a common vertical wall 56 best shown in FIG. 2. The opposite sides and especially the major lower portion of both of these bins is defined by sloping walls 58 and 60 which extend inward from oposite sidewalls and slope toward the bottom in which metering augers 62,64 are mounted, the walls 58 and 60 thus forming a V-shaped configuration which insures the material in the bins descending to the metering augers respectively therein. The metering auger 64 in bin 54 is separate from the metering auger 62 in bin 52.

Fitted sidewise into the spaces below the sloping sidewalls 58 and 60 of rearward bin 54 are additional bins 66 and 68 which each have a forwardly and downwardly sloping wall 70, see FIG. 2, which insures gravitational feed of the materials therein to the metering augers 72 and 74 respectively provided therein. As seen in FIG. 2, there are additional angular bottom walls 76 and 78 in bins 52,54 which slope away from each other respectively toward the metering augers 62 and 64 as shown in FIG. 2. From FIG. 2, it will also be seen that all of the metering augers of the respective bins have an exit end adjacent a space 80 directly above the confluence and mixing auger 34 so that the latter receives material from the respective metering augers simultaneously for active mixing thereof within the tubular housing 32 in which the auger 34 rotates.

In general, in accordance with the sizes of the various bins, the component of highest percentage naturally will be filled in the largest bin 52, the second largest in bin 54, and two additional smaller percentages of ingredients will be accommodated in bins 66 and 68. Due to the smaller capacity and corresponding smaller percentages of such latter ingredients, they readily may be introduced into the bins 66,68 manually and for that purpose, said bins respectively have hinged top covers 82 and 84 as best shown in FIG. 3. Access to the covers is obtained within the spaces exterior of the sloping sidewalls 58 and 60 of the first and second bins 52 and 54.

For purposes of feeding individual kinds of different material respectively to the bins 52 and 54, for example, the upper portions thereof support a horizontal upper distributing auger 86 which is operable within a tubular housing 88 which extends prefereably entirely along the bins 52 and 54 and has one end extending into bin 54, the housing 88 being open at the end thereof in bin 54. Further, housing 88 also has an opening 90 disposed over bin 52 and a closure member 92 which preferably is tubular or partly tubular and is provided with a discharge opening 94 therein which, when the closure member 92 is rotated about the axis of auger 86, the opening 94 may be brought in to register with the opening 90 in the tubular housing 88. This preferably is accomplished manually by means of a radial arm 96 extending from the closure member 92 and connected at its outer end to a manually operable link 98, see FIG. 3, which is adjustably positionable with respect to a fixture 100 which may be connected at one end to wall 56. The outer end of link 98 is engageable through a trap door 102, see FIG. 3, or through an opening in the top wall of bin 52.

The foregoing description with regard to upper distributing auger 86 pertains to the function of said auger for purposes of filling or partially filling the bins 52 and 54 by means of the feeding functions of confluence and mixing auger 34 and elevating auger 36 which operate in conjunction with each other when the metering augers for the various bins are idle. Under such circumstances, the auger 86 operates in a feeding direction of rotation through the means of a gear shift unit 104 supported by brackets 106 fixed to the lefthand end of tubular housing 88 as shwon in FIG. 2. The terminal end of the shaft of auger 86 has a bevel gear 108 affixed thereto for selective engagement by either the upper or lower bevel gears 110 and 112 which are affixed to shaft 114 and are spaced sufficiently that only one of the bevel gears is engageable with driven bevel gear 108 at any time. Shaft 114 is driven by a sprocket chain 116 which extends around sprockets respectively mounted on shaft 114 and the upper extremity of the shaft 118 of the elevating auger 36. Axial shifting of the shaft 114 is accompmlished by means of a shift rod 120 as shown in FIG. 2, the lower end of which is operated by a pivoted shift lever 122 mounted, for example, on the top of the housing of the hammermill 22 as shown in FIG. 2.

The end of the tubular housing 88 of upper distributing auger 86 which is nearest the gear shift unit 104 communicates with the upper end of a substantially vertical conduit 124 which discharges at its lower end into the housing of hammermill 22. The purpose of the gear shift unit 104 is to effect reversible rotation of the distributing auger 86 and when the same is rotated in an opposite direction from that in which auger 86 distributes material to bins 52 and 54, said auger will feed mixed material as it discharges from the upper end of elevating auger 36 for gravity feed down conduit 124 to the hammermill in which the mixed material is ground to a finer degree and the operation of the hammermill also effects further mixing of the material until the same is ready for discharge from the lower part of the housing of hammermill 22 in which a horizontal converging auger 126 is rotatably mounted to feed ground material from opposite sides of the hammermill to the center thereof where it is discharged into the lower end of an inclined discharge housing 128 within which a discharge auger 130 is mounted and is driven by bevel gears respectively fixed to the lower end of the shaft of auger 130 and on additional jack shaft 132, see FIG. 2 Said jack shaft is driven by sprocket chain 134 which extends around sprocket gears respectively fixed to the shaft of mixing auger 34 and jack shaft 132 a shown in FIG. 2.

The upper end of the inclined discharge housing 128 exits into a depending chute 136, see FIG. 4, which is directly above an inlet hopper 138 from which one end of a laterally extending discharge auger 140 projects within a complementary tube 142.

With the exception of the metering augers which have been described and referred to hereinabove, all of the other augers thus far described are driven by the PTO shaft 18, operation of which is controlled by the power unit from which the shaft 18 is mounted, such as a tractor. The metering augers however are driven by individual D.C. electric motors as controlled by switches and adjustable control means such as rheostats mounted within control box 144 shown in the lower portion of FIG. 1. Also as shown in FIG. 1, shaft 28 of the hammermill drives an electric A.C. generator 146 shown in the lower part of FIG. 1 through the means of a sprocket chain 148. The electric control box 144 also contains converters to provide D.C. voltage from the A.C. generator 146 and, by suitable circuit lines, now shown, the D.C. current as controlled by the control elements in the box 144, is conducted respectively to the D.C. motor 150 which drives metering auger 62 in forward bin 52 by means of a sprocket chain 152; D.C. motor 154 for metering auger 64 in the bottom of bin 54 which is driven by sprocket chain 156; D.C. motor 158, see FIG. 3, for metering auger 72 in the bottom of bin 66, driven by sprocket chain 160, see FIG. 1, lower right corner; and D.C. motor 162 for metering auger 74 in the bottom of bin 68, driven by sprocket chain 164. Varying the speeds of the D.C. motors described above is easily facilitated by the control means mounted in the electric control box 144, such as rheostats or other similar means. Further, the control means are operated to render the metering augers idle such as when the bins are having material delivered thereto by mixing auger 34, elevating auger 36 and upper distributing auger 86, under which conditions the auger 34 serves primarily as a delivery auger rather than a mixing auger due to each of the bins requiring different materials in unmixed condition. However, when auger 34 is to serve in a mixing capacity, the speed of the various metering augers are regulated by adjusting the control means in box 144, as required according to a desired formulation, whereby various components for the mixture are delivered to space 80 wherein the discharges from all of the metering augers converge for delivery of the respective components to the mixing auger 34 and from there it ascends in at least partially mixed condition by the elevating auger 36 to the portion of the upper distributing auger 86 which extend to the inlet end of conduit 124, which directs the mixed material to the mixing unit 22 specifically illustrated as a hammermill or the like, wherein not only grinding of the material occurs but further mixing thereof is also produced.

As referred to hereinabove, the principal thrust of the present invention is directed to the feeding of desired quantities of additive material, such as certain chemicals, medicinal drugs, vitamins or otherwise as is now becoming modern practice in the preparation of feeds for various types and classes of animals. To accomplish this, it is preferred that the additive be blended with the mixed material as it is being discharged from the machine and the preferred mechanism by which this is accomplished is best illustrated in FIG. 5 which essentially is a flow sheet illustrating the mechanism and especially the controls for certain elements of the machine.

Figure 5:
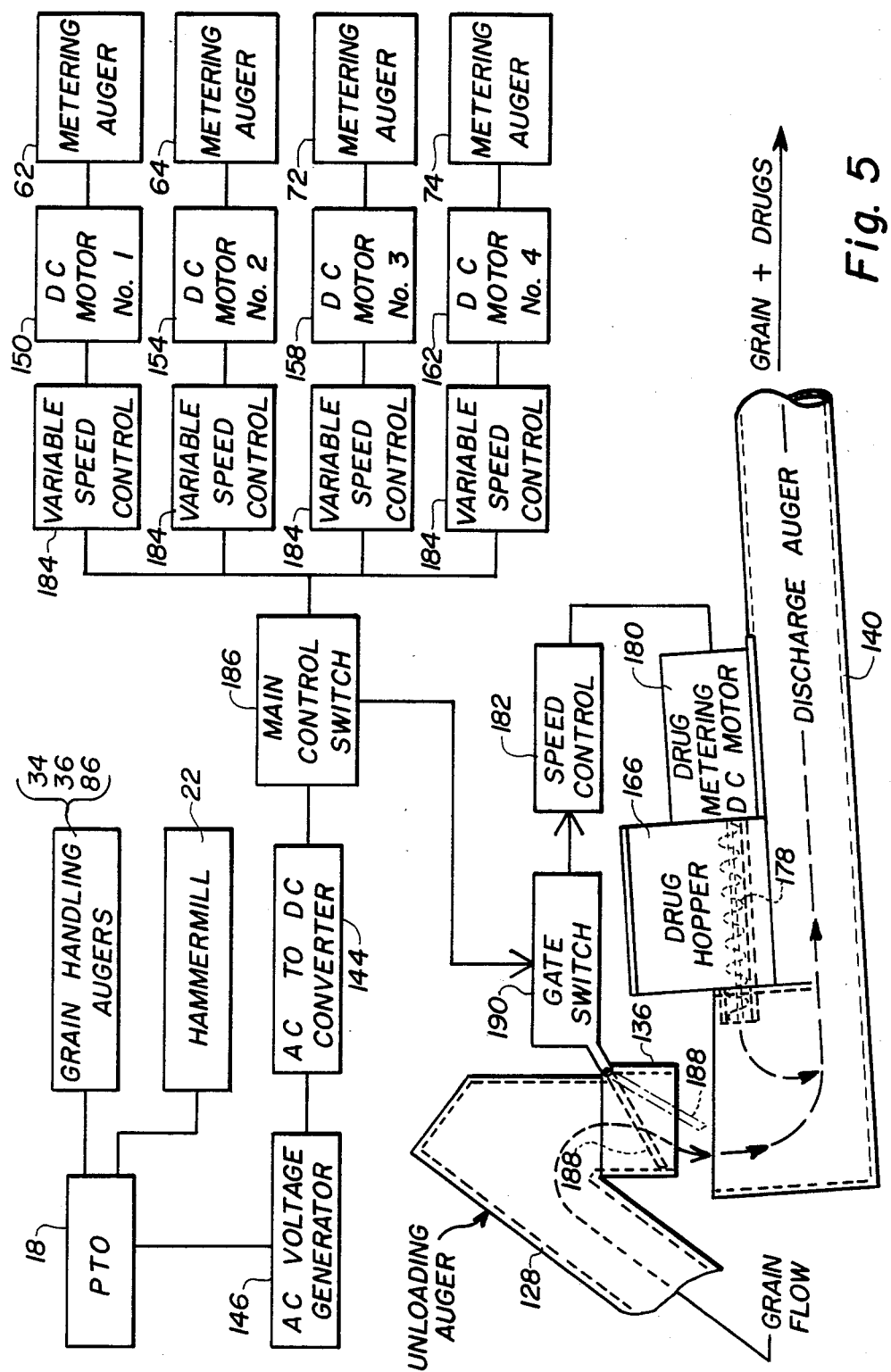
FIG. 5 is a block diagram of the operating and control system of the present invention.

To relate the disclosure of FIG. 5 to the invention, attention is also directed to FIGS. 3 and 4 in which the discharge mechanism primarily is illustrated. By way of example, and without restriction, it will be seen that a container or hopper 166 is mounted upon the tube 142 in fixed relationship thereto and in which the discharge auger 140 is rotatable. Said auger is driven by meshing bevel gears 168 and 170, the gear 168 being fixed to shaft 172 contained within supporting tube 174 upon which the lower end of tube 142 is affixed for support. Shaft 172 also is driven by meshing bevel gears respectively affixed to shaft 172 and shaft 176 which is affixed to shaft 132, see FIG. 2 in the lower left portion thereof.

Mounted within the lower portion of hopper 166 is a metering auger 178 which is driven by a separate D.C. electric motor 180, the speed of which is controlled by a speed control switch 182 shown in FIG. 5.

Referring to the electrical control box 144 shown in FIG. 1, it will be seen therein that a number of relatively small adjustable switches are shown without designation. In FIG. 5, these comprise various control switches 182 respectively for the D.C. motors which operate the metering augers 62,72,72 and 74 shown in the lower portions of the various bins in FIGS. 1-3. Without restriction thereto, said control switches may be associated with rheostats, or otherwise, suitable for varying the supply of D.C. current to the motors and thereby control the speed of operation of the various meeting augers to achieve a desired composition of mixed feed product. It also will be understood at this portion of the description that, with the exception of the metering augers in the machine, including metering auger 178 in the hopper 166, the operation of all of the various augers in the machine by which material is distributed in one way or another, including the discharge auger 140, are operated by the PTO shaft 18 and thus the operation of said augers is under different control means usually mounted for convenience upon the tractor, for example, which supplies the power to the PTO shaft 18. This is of importance for several reasons described below.

When the PTO shaft 18 is operating the various augers of the machine, either for loading the various feed bins or for mixing and/or grinding the material and it is desired to operate the metering augers in the bottoms of the various bins, a main control switch 186 on control box 144, for example, is closed after all of the various speed controls for the D.C. motors have been adjusted to provide the desired proportions of the materials to be mixed. If an additive is to be added to the mixture from hopper 166 as the material passes through the discharge conduit through operation of the discharge auger 140, feed of the additive material may be accomplished in one of several ways as now described below. In accordance with the invention, it is possible that one means for controlling the speed of the metering auger 178 for the additive material is in accordance with the volume of the mixed material being discharged by housing 128 into the depending chute 136. To implement such control, a pivoted valve plate 188 is mounted within the depending chute 136 as shown in the lower left portion of FIG. 5 and the oncoming mixed material will depress said plate into various positions, depending upon the volume of the discharging material. One exemplary open position is shown in phantom in the figure. Associated with the plate 188 is a gate switch 190 which, for example, is in circuit with the speed control switch 182 that is capable of varying the speed of the metering auger 178 in accordance with the volume of the material being discharged through the chute 136 as it moves to the discharge auger 140.

A second way in which the speed of operation of the auger 178 maybe controlled is simply to set the switch at a selected speed and disconnect the gate switch from the speed control switch 182, whereby when oncoming mixed material engages the plate 188, it will close the gate switch 190 and thereby initiate operation of the metering auger 178 at the aforementioned set speed of operation.

Operation of the mechanism described above provides another advantageous improvement which has been found desirable in connection with including an additive with a mixture of feed material, especially when addition of the additive is to be discontinued at the end of a certain run or operation, for example, and thereafter the machine is used soley to mix feed ingredients per se. To describe this advantage, assume that the PTO shaft 18 is operating to drive all of the various augers for conveying means and including the metering augers for the various bins. When feeding of the additive from hopper 166 is to be discontinued, it is only necessary to open the main control switch 186, whereupon all of the metering augers cease to operate, including the additive auger 178, thus stopping the feeding of the additive. Meanwhile, however, PTO shaft 18 continues to operate all of the augers with the exception of the electrically driven metering augers and therefore all of the mixed material which is contained at that time in the confluence and mixing auger 34, elevating auger 36, upper distributing auger 86, hammermill 22, inclined discharge auger 130 and discharge auger 140 will continue to operate until substantially no residue of mixed feed material will occur in the system and such additional discharge solely of the mixed feed material serves to purge the system of the additive previously fed from hopper 166 by its metering auger 178.

From the foregoing, it will be seen that relatively simple, straightforward mechanisms have been combined in a manner capable of producing a relatively wide range of mixtures of different agricultural feed materials which, when the mixture is discharged from the machine, is in condition to be delivered either to storage, feed means such as feed bins or troughs, or otherwise. By a simple adjustment of electrical control means, and/or the speed of the power unit connected to the PTO, a precise composition of a mixed agricultural feed product is made possible.

The invention is primarily concerned with additional mechanism by which additive material may be included in a desired mixture of feed materials, in controlled quantities, accomplished by one of several means. As an additional feature, at the completion of including such additives, by simple operation of a switch, the delivery and conveying augers of the machine, which are driven by the PTO for the machine, continue to operate at least for a sufficient period of time to purge the conduits and delivery augers of the additive materials.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A feed material mixing and blending machine comprising a plurality of bins respectively arranged to receive different feed materials, mixing mechanism to produce a mixture of said materials, metering means in each bin operable to feed said materials to said mixing mechanism to produce said mixture of said materials, conveying and discharge means operable to receive and convey said mixture for removal from said machine, in combination with separate power means respectively for said metering means and said conveying and discharge means, a container supported in said machine in communication with said discharge means and adapted to contain an additive material, additional metering means in said container operable to feed a controlled amount of said additive material to said discharge means and powered by the power means for said metering means for said bins, and control means for said power means respectively operable to stop at least the metering means for said additive material when feeding of the additive material is to stop.

2. The machine according to claim 1 further including electrical generating means comprising the power means for said metering means and a PTO driven shaft comprising the power means for said conveying and discharge means, said power means for said conveying and discharge means being adjusted to continue to drive the same to purge such means of all material therein after said metering means has stopped.

3. The machine according to claim 2 in which said electrical generating means comprises an A.C. generator driven by said PTO driven shaft, said control means comprising an electrical converter operable to change to A.C. current to D.C. current, the power means for said metering means comprising D.C. motors, and said control means also including D.C. variable speed control means to enable the speed of said metering means to be varied and thereby arrange the discharge from the bins and container for said respective materials to be regulated to produce a material mixture of desired composition.

4. The machine according to claim 3 in which the control means comprises a separate on-off switch for the D.C. motor which drives the metering means for said container for additive material, whereby delivery of additive material to the mixed feed material as fed to the discharge means may selectively be delivered or not thereto, as desired.

5. The machine according to claim 4 further including an inclined discharge housing operable to be variably pivoted in accordance with the volume of mixed material being discharged from said discharge means, a depending chute on said housing and a pivoted valve gate in said chute, and a gate switch being further included in the control means for the metering means for said container for additive material, said gate switch being of speed control nature operable to increase or decrease the speed of the metering means for said container for additive material as the valve gate in said depending chute progressively moves in opening or closing directions, whereby the amount of additive material delivered to the discharging mixed material varies proportionately to the volume of mixed material discharging through aaid depending chute and valve gate therein.

6. The machine according to claim 2 in which said control means includes a manual main control switch operable when opened to stop operation of all metering means in each bin and said container, whereby delivery of all materials and additive to the conveying and discharge means ceases while said PTO driven power means continues to operate said conveying and discharge means as aforesaid to purge the same from any inclusion of said additives.

7. The machine according to claim 1 further including electrical generating means comprising the power means for said metering means and a PTO driven shaft comprising the power means for said conveying and discharge means.

8. The machine according to claim 7 in which said electrical generating means comprises an A.C. generator driven by said PTO driven shaft, said control means comprising an electrical converter operable to change A.C. current to D.C. current, the power means for said metering means comprising a D.C. motor, and said control means also including D.C. variable speed control means to enable the speed of said metering means to be varied and thereby arrange the discharge from the bin to be regulated to produce a material mixture of desired composition.

9. The machine according to claim 8 in which the control means comprises an on-off switch for the D.C. motor which drives the metering means for said container for additive material, whereby delivery of additive material to the mixed feed material as fed to the discharge means may selectively be delivered or not thereto, as desired.

10. The machine according to claim 9 further including an inclined discharge housing operable to be variably pivoted in accordance with the volume of mixed material being discharged from said discharge means, a depending chute on said housing and a pivoted valve gate in said chute, and a gate switch being further included in the control means for the metering means for said container for additive material, said gate switch being of speed control nature operable to increase or decrease the speed of the metering means for said container for additive material as the valve gate in said depending chute progressively moves in opening or closing directions, whereby the amount of additive material delivered to the discharging mixed material varies proportionately to the volume of mixed material discharging through said depending chute and valve gate therein.

11. A feed material mixing machine comprising at least two bins arranged to receive different feed materials, mixing mechanism to produce a mixture of said materials, means operable to feed said materials to said mixing mechanism to produce said mixture of said materials, conveying and discharge means operable to receive and convey said mixture for removal from said machine, in combination with power means for said conveying and discharge means, a container supported in said machine in communication with said discharge means and adapted to contain an additive material, metering means in said container operable to feed a controlled amount of said additive material to said discharge means and powered by the power means, control means for said power means operable to stop the metering means for said additive material when feeding of the additive material is to stop and said control means further being operable to continue the operation of said conveying and discharge means after said metering means has stopped to purge said means of all material therein.

12. The machine according to claim 11 in which said control means includes a manual main control switch operable when opened to stop operation of said metering means in said container, whereby delivery of all materials and additive to the conveying and discharge means ceases while said power means continues to operate said conveying and discharge means as aforesaid to purge the same from any inclusion of said additives.

* * * * *